(12) United States Patent
Brothers et al.

(10) Patent No.: US 7,755,632 B2
(45) Date of Patent: Jul. 13, 2010

(54) GPU INTERNAL WAIT/FENCE SYNCHRONIZATION METHOD AND APPARATUS

(75) Inventors: John Brothers, Calistoga, CA (US); Hsilin Huang, Milpitas, CA (US); Boris Prokopenko, Milpitas, CA (US)

(73) Assignee: VIA Technologies, Inc., Hsin-Tien, Taipei (TW)

( * ) Notice: Subject to any disclaimer, the term of this patent is extended or adjusted under 35 U.S.C. 154(b) by 717 days.

(21) Appl. No.: 11/552,649

(22) Filed: Oct. 25, 2006

(65) Prior Publication Data

US 2007/0115292 A1 May 24, 2007

Related U.S. Application Data

(60) Provisional application No. 60/730,444, filed on Oct. 26, 2005.

(51) Int. Cl.
G06F 13/00 (2006.01)

(52) U.S. Cl. ........................ 345/520; 345/502

(58) Field of Classification Search ................. 709/248; 345/502, 505, 506
See application file for complete search history.

(56) References Cited

U.S. PATENT DOCUMENTS

| | | | |
|---|---|---|---|
| 4,855,936 A | 8/1989 | Casey et al. | |
| 4,862,155 A | 8/1989 | Dalrymple et al. | |
| 4,916,301 A | 4/1990 | Mansfield et al. | |
| 5,097,411 A | 3/1992 | Doyle et al. | |
| 5,230,039 A | 7/1993 | Grossman et al. | |
| 5,293,587 A | 3/1994 | Deb et al. | |
| 5,299,309 A | 3/1994 | Kuo et al. | |
| 5,315,696 A | 5/1994 | Case et al. | |
| 5,706,478 A | 1/1998 | Dye | |
| 6,208,361 B1 | 3/2001 | Gossett | |
| 6,252,610 B1 | 6/2001 | Hussain | |
| 6,329,996 B1 | 12/2001 | Bowen et al. | |
| 6,476,808 B1 | 11/2002 | Kuo et al. | |
| 6,483,505 B1 | 11/2002 | Morein et al. | |
| 6,708,269 B1 * | 3/2004 | Tiruvallur et al. ........... 712/225 |
| 6,782,432 B1 | 8/2004 | Nelson et al. | |
| 6,806,880 B1 | 10/2004 | Mukherjee et al. | |
| 6,833,831 B2 | 12/2004 | Emberling et al. | |

(Continued)

OTHER PUBLICATIONS

Brothers, et al., Non-Final Office Action, mailed Apr. 22, 2009, filed Aug. 30, 2006, U.S. Appl. No. 11/468,435.

*Primary Examiner*—Ulka Chauhan
*Assistant Examiner*—Robert Bader
(74) *Attorney, Agent, or Firm*—Thomas, Kayden, Horstemeyer & Risley

(57) ABSTRACT

A GPU pipeline is synchronized by sending a fence command from a first module to an addressed synchronization register pair. Fence command associated data may be stored in a fence register of the addressed register pair. A second module sends a wait command with associated data to the addressed register pair, which may be compared to the data in the fence register. If the fence register data is greater than or equal to the wait command associated data, the second module may be acknowledged for sending the wait command and released for processing other graphics operations. If the fence register data is less than the wait command associated data, the second module is stalled until subsequent receipt of a fence command having data that is greater than or equal to the wait command associated data, which may be written to a wait register associated to the addressed register pair.

16 Claims, 5 Drawing Sheets

U.S. PATENT DOCUMENTS

| | | |
|---|---|---|
| 6,867,781 B1 | 3/2005 | Van Hook et al. |
| 6,954,204 B2 | 10/2005 | Zatz et al. |
| 7,353,369 B1 | 4/2008 | Coon et al. |
| 7,421,694 B2 * | 9/2008 | Gosalia et al. .............. 718/104 |
| 2003/0001840 A1 | 1/2003 | Spitzer et al. |
| 2003/0023971 A1 | 1/2003 | Martinolich et al. |
| 2003/0169259 A1 | 9/2003 | Lavelle et al. |
| 2004/0008200 A1 | 1/2004 | Naegle et al. |
| 2004/0135787 A1 | 7/2004 | Parikh et al. |
| 2004/0160446 A1 | 8/2004 | Gosalia et al. |
| 2004/0189650 A1 | 9/2004 | Derring |
| 2005/0030311 A1 | 2/2005 | Hara et al. |
| 2005/0046633 A1 | 3/2005 | Aleksic et al. |

* cited by examiner

GPU INTERNAL WAIT/FENCE SYNCHRONIZATION METHOD AND APPARATUS

CROSS REFERENCE TO RELATED APPLICATION

This application claims priority to U.S. Provisional Application entitled "GPU Synchronization and Scheduling System, Method, and Apparatus," having Ser. No. 60/730,444, as filed on Oct. 26, 2005, which is entirely incorporated herein by reference. This application is also related to copending U.S. patent application Ser. Nos. 11/468,135 filed Aug. 30, 2006 and 11/552,693 filed Oct. 25, 2006.

TECHNICAL FIELD

The present disclosure relates to graphics processing, and more particularly, to a method and apparatus for synchronizing and controlling internal components of a graphics pipeline.

BACKGROUND

Current computer applications are generally more graphically intense and involve a higher degree of graphics processing power than predecessors. Applications, such as games, typically involve complex and highly detailed graphics renderings that involve a substantial amount of ongoing computations. To match the demands made by consumers for increased graphics capabilities in computing applications, like games, computer configurations have also changed.

As computers, particularly personal computers, have been programmed to handle programmers' ever increasingly demanding entertainment and multimedia applications, such as high definition video and the latest 3D games, higher demands have likewise been placed on system bandwidth. Thus, methods have arisen to deliver the bandwidth for such bandwidth hungry applications, as well as providing additional bandwidth headroom for future generations of applications.

For these reasons, current computer systems oftentimes include multiple processors. For example, a graphics processing unit (GPU) is an example of a coprocessor in addition to a primary processor, such as a central processing unit (CPU), that performs specialized processing tasks for which it is designed. In performing these tasks, the GPU may free the CPU to perform other tasks. In some cases, coprocessors, such as a GPU, may actually reside on the computer system's motherboard along with the CPU, which may be a microprocessor. However, in other applications, as one of ordinary skill in the art would know, a GPU and/or other coprocessing devices may reside on a separate but electrically coupled card, such as a graphics card in the case of the GPU.

A coprocessor such as a GPU may often access supplemental memory, such as video memory, for performing its processing tasks. Coprocessors may be generally configured and optimized for performing specialized tasks. In the case of the GPU, such devices may be optimized for execution of three dimensional graphics calculations to support applications with intensive graphics. While conventional computer systems and coprocessors may adequately perform when running a single graphically intensive application, such computer systems and coprocessors may nevertheless encounter problems when attempting to execute multiple graphically intensive applications at once.

It is not uncommon for a typical coprocessor to schedule its processing workload in an inefficient manner. In some operating systems, a GPU may be multitasked using an approach that submits operations to the GPU in a serialized form such that the GPU executes the operations in the order in which they were received.

One problem with this approach is that it does not scale well when many applications with differing priorities access the same resources. In this nonlimiting example, a first application that may be currently controlling the resources of a GPU coprocessor needs to relinquish control to other applications for the other applications to accomplish their coprocessing objectives. If the first application does not relinquish control to the other waiting application, the GPU may be effectively tied up such that the waiting application is bottlenecked while the GPU finishes processing the calculations related to the first application. As indicated above, this may not be a significant bottleneck in instances where a single graphically intensive application is active; however, the problem of tying up a GPU or other coprocessor's resources may become more accentuated when multiple applications attempt to use the GPU or coprocessor at the same time.

The concept of apportioning processing between operations has been addressed with the concept of interruptible CPUs that context switch from one task to another. More specifically, the concept of context save/restore has been utilized by modern CPUs that operate to save the content of relevant registers and program counter data to be able to resume an interrupted processing task. While the problem of apportioning processing between the operations has been addressed in CPUs, where the sophisticated scheduling of multiple operations is utilized, scheduling for coprocessors has not been sufficiently addressed.

At least one reason for this failure is related to the fact that coprocessors, such as GPUs, are generally viewed as a resource to divert calculation-heavy and time consuming operations away from the CPU so that the CPU may be able to process other functions. It is well known that graphics operations can include calculation-heavy operations and therefore utilize significant processing power. As the sophistication of graphics applications has increased, GPUs have become more sophisticated to handle the robust calculation and rendering activities.

Yet, the complex architecture of superscalar and EPIC-type CPUs with parallel functional units and out-of-order execution has created problems for precise interruption in CPUs where architecture registers are to be renamed, and where several dozens of instructions are executed simultaneously in different stages of a processing pipeline. To provide for the possibility of precise interrupts, superscalar CPUs have been equipped with a reorder buffer and an extra stage of "instruction commit (retirement)" in the processing pipeline.

Current GPUs are becoming more and more complex by including programmable and fixed function units connected by multiple FIFO-type buffers. Execution of each GPU command may take from hundreds to several thousand cycles. GPU pipelines used in today's graphics processing applications have become extremely deep in comparison to CPUs. Accordingly, most GPUs are configured to handle a large amount of data at any given instance, which complicates the task of attempting to apportion the processing of a GPU, as the GPU does not have a sufficient mechanism for handling this large amount of data in a save or restore operation.

Modern GPU configurations that have evolved so as to handle large amounts of data have taken upon complex shapes that involve new mechanisms for synchronization for the pipeline units in data stream processing. Using programmable parallel processing units in addition to main fixed function graphics pipeline units involves maintaining the order of graphics primitive data that may be received and updated in the different stages of the GPU pipeline. Plus, maintaining multiple contexts simultaneously with interruptability in the graphics pipeline of the GPU involves the resynchronization of such interrupted context with minimal performance loss and smooth switching between an interrupted and resumed graphics context. Current GPU configurations, however, do not handle synchronization of contexts and data access well, instead resulting in a complete flush of the pipeline, thereby resulting in less efficient operation and reduced graphics capabilities.

Further, multi pass rendering when a GPU renders a surface that becomes a source surface for a next pass also involves synchronization to avoid RAW (read-after-write) data hazards when a second pass starts to access the shared surface. Plus, situations involving premature write hazards also have to be dealt with without having to drain the entire pipeline of the graphics engine. Conventional graphics pipelines are not constructed to handle these instances quickly and efficiently.

For instance, when the GPU processing needs to change between one processing component and another component, for example, because the second component needs data from the first and has to, therefore, wait for the data. The switch has to occur after all writes to a shared memory from the first component are completed before the second component can start reading from the shared memory for subsequent data. However conventional GPU pipelines cannot handle this situation adequately, which may likely lead to a drain of the pipeline, thereby substantially slowing processing operations and introducing inefficiencies into graphics processing operations.

Plus, synchronization with CPU task execution when a GPU is supposed to start and/or resume execution of a certain context execution depending upon events in CPU threads may also be an issue in current GPU processing implementations. Yet, current GPUs are simply unable to communicate and respond to such changes in a timely manner so as to maintain pace with the increasing demands of graphics applications.

Thus, there is a heretofore-unaddressed need to overcome these deficiencies and shortcomings described above.

SUMMARY

Components of a GPU pipeline may be internally and individually synchronized. As a nonlimiting example, one step comprises instructing a first graphics pipeline module to send a fence command to an addressed counter register of a designated module in the GPU pipeline. The designated GPU module may be a memory access unit having a number of addressable counter registers. The fence command may be acknowledged by the designated GPU module upon receipt, and data associated with the fence command may be stored in a fence registry of the addressed counter register.

A second graphics pipeline module may be instructed to send a wait command to the addressed counter register of the designated GPU module. A data portion of the wait command may be compared to the data value stored in the fence registry of the addressed counter register.

In this nonlimiting example, if the data value stored in the fence registry of the addressed counter register is greater than or equal to the data portion of the wait command, the designated GPU module may acknowledge receipt of the wait command from the second graphics pipeline module, thereby releasing the second graphics pipeline module for a next operation. However, if the data value stored in the fence registry of the addressed counter register is less than the data portion of the wait command, the designated GPU module may not acknowledge receipt of the wait command from the second graphics pipeline module. Thus, the second graphics pipeline module may be stalled from performing a next operation until the designated GPU module receives a fence command from the first graphics pipeline module for the addressed counter register that is greater than or equal to the data portion of the wait command.

Until such receipt, the designated GPU module may store the data portion of the wait command in a wait registry associated with the addressed counter register. Plus, the designated GPU module may set a wait pending register to a logical status corresponding to a wait process associated with the second graphics pipeline module. In this manner, the first and second graphics pipeline modules may be individually synchronized with each other internally within the GPU.

DETAILED DESCRIPTION OF DRAWINGS

DETAILED DESCRIPTION

Figure 1:
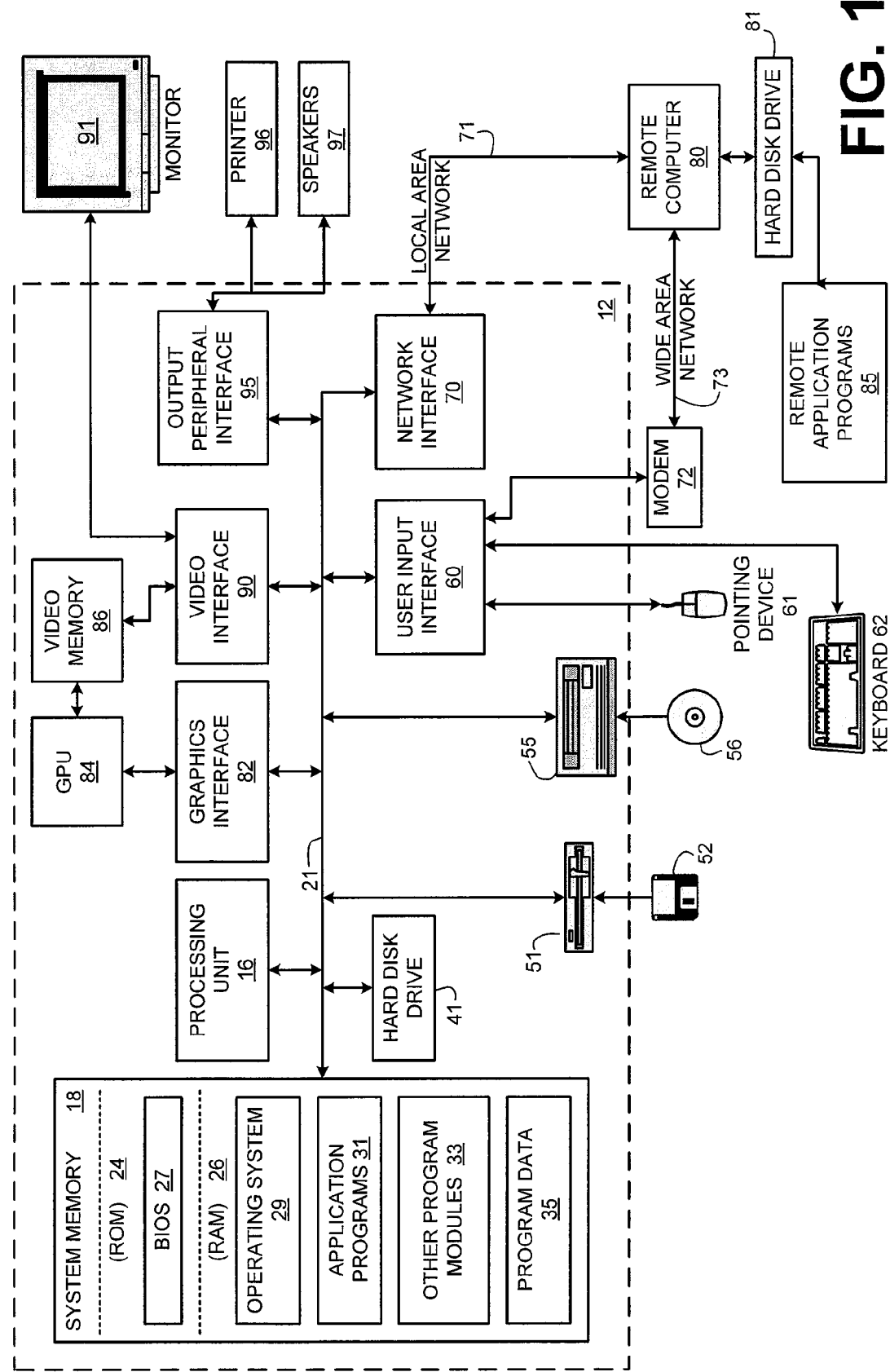
FIG. 1 is a diagram illustrating an exemplary nonlimiting computing system that includes a computer.

FIG. 1 is a diagram illustrating an exemplary nonlimiting computing system 10 that includes a computer 12. The components of the computer 12 may include, as nonlimiting examples, a processing unit 16, a system memory 18, and a system bus 21 that couples various system components, including the system memory 18, to the processing unit 16. The system bus 21 may be any of several types of bus structures, as one of ordinary skill in the art would know, including a memory bus or memory controller, a peripheral bus, and a local bus using any of a variety of bus architectures. As a nonlimiting example, such architectures may include a peripheral component interconnect (PCI) bus, accelerated graphics port (AGP), and/or PCI Express bus.

Computer 12 may include a variety of computer readable media. Computer readable media can be any available media that can be accessed by computer 12 and includes both volatile and nonvolatile memory, which may be removable, or nonremovable memory.

The system memory 18 may include computer storage media in the form of volatile and/or nonvolatile memory, such as read only memory (ROM) 24 and random access memory (RAM) 26. A basic input/output system 27 (BIOS) may be stored in ROM 24. As a nonlimiting example, operating system 29, application programs 31, other program modules 33, and program data 35 may be contained in RAM 26.

Computer 12 may also include other removable/nonremovable volatile/nonvolatile computer storage media. As a nonlimiting example, a hard drive 41 may read from or write to nonremovable, nonvolatile magnetic media. A magnetic disk drive 51 may read from or write to a removable, nonvolatile magnetic disk 52. An optical disk drive 55 may read from or write to optical disk 56.

A user may enter commands and information into computer 12 through input devices such as keyboard 62 and pointing device 61, which may be coupled to processing unit 16 through a user input interface 60 that is coupled to system bus 21. However, one of ordinary skill in the art would know that other interface and bus structures such as a parallel port, game port, or a universal serial bus (USB) may also be utilized for coupling these devices to the computer 12.

One or more graphics processing units (GPUs) 84 may communicate with the graphics interface 82 that is coupled to system bus 21. As a nonlimiting example, GPU 84 may include on-chip memory storage, such as register storage and cache memory. GPU 84 may also communicate with a video memory 86, as desired.

A monitor 91 or other type of display device may be also coupled to system bus 21 via a video interface 90, which may also communicate with video memory 86. In addition to monitor 91, computer system 10 may also include other peripheral output devices, such as printer 96 and speakers 97, which may be coupled via output peripheral interface 95.

Computer 12 may operate in networked or distributed environments using logical connections to one or more remote computers, such as remote computer 80. Remote computer 80 may be a personal computer, a server, a router, a network PC, a pier device, or other common network node. Remote computer 80 may also include many or all of the elements described above in regard to computer 12, even though only memory storage device 81 and remote application programs 85 are depicted in FIG. 1. The logical connections depicted in FIG. 1 include a local area network (LAN) 71 and a wide area network (WAN) 73, but may include other network/buses, as one of ordinary skill in the art would know.

In this nonlimiting example of FIG. 1, remote computer 80 may be coupled to computer 12 via LAN connection 71 and network interface 70. Likewise, a modem 72 may be used to couple computer 12 (via user input interface 60) to remote computer 80 across WAN connection 73.

Figure 2:
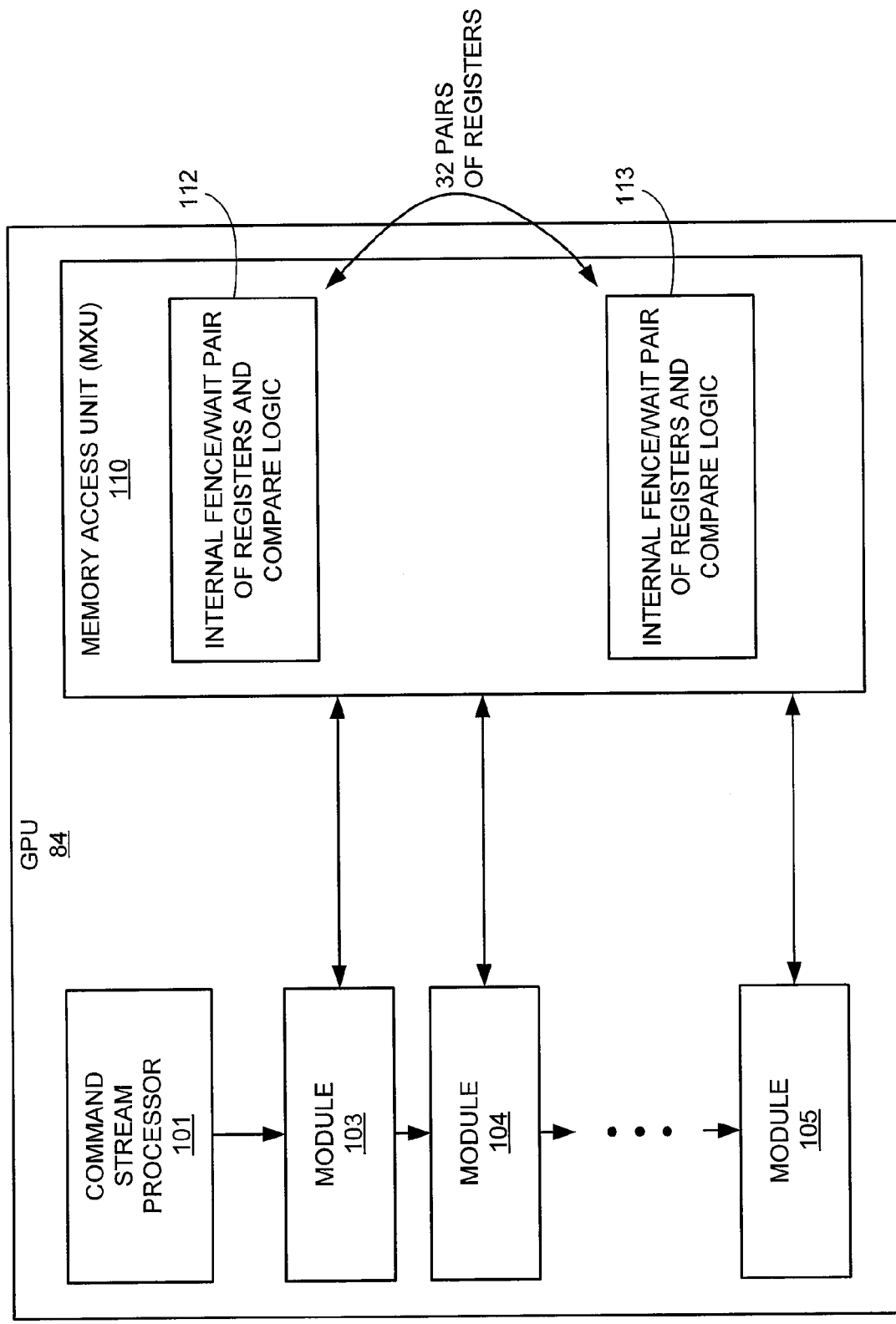
FIG. 2 is a diagram of a select portion of components of the GPU of FIG. 1, as may be configured for implementing internal fence/wait synchronization.

FIG. 2 is a diagram of GPU 84 of FIG. 1 with a portion of the components that may be implemented within GPU 84, as one of ordinary skill in the art would know. Todays GPUs are quite complex in their construct, including the number of various processing components that are configured to execute instructions related to graphic operation in parallel and in sequence so as to produce graphics related data as quickly as possible. Thus, one of ordinary skill in the art would know that GPU 84 of FIG. 2 displays but a portion of the components that would otherwise be found in a typical GPU having one or more graphics pipelines configured for various two-dimensional and three-dimensional processing operations.

Due to the complexity of the current GPU configurations, applications arise, as described above, wherein the various components of the GPU need to be synchronized so that related data can be processed at or about the same time. Stated another way, the various components of the GPU 84 may operate on related data entities at various stages of the GPU pipeline (a nonlimiting exemplary portion of which is shown in FIG. 2) such that one component or a series of components of the GPU 84 needs to wait on yet another series of components within the GPU 84 to finish processing operations so as to combine related data for further processing and graphics rendering. Thus, GPU 84 of FIG. 2 may be configured to internally synchronize the various components of the GPU 84 so as to increase the speed and efficiency of graphics processing operations.

Internal synchronization, which may also be known as internal fence and/or wait, may be a mechanism implemented in the GPU 84 of FIG. 2 so as to control the internal pipeline synchronization of the various components of GPU 84, such as command stream processor 101 and modules 103, 104, and 105, which are but three nonlimiting exemplary modules that may be found in GPU 84, as one of ordinary skill in the art would know. Internal graphics pipeline synchronization may be utilized by GPU 84 so as to deal with any read-after-write or premature write hazards without having to drain the entire graphics engine pipeline in GPU 84.

As a nonlimiting example regarding an internal synchronization implementation between two components of the GPU 84 (which could be any of modules 103, 104 and 105 of FIG. 2), a driver may communicate an internal fence, or token (which, as a nonlimiting example, may be a type of command) with a particular value, as one of ordinary skill in the art might know, to a block or a module that draw commands in another part of the graphics pipeline needs to wait on before completing processing in that part of the graphics pipeline. So as applied to switching from the two components of GPU 84, all writes to a memory component of a graphics pipeline of GPU 84 from a first component, which may be module 103, should be completed before the second component, which may be represented as module 105 of FIG. 2, starts reading from the memory component of the GPU 84 for subsequent operations In this case, the driver implemented by GPU 84 should follow a last object, such as a triangle, that used the first component (module 103) with an internal fence, or token (which, as a nonlimiting example, may be a command type), directed to the second component, which may be module 105. Processing may then proceed with the next triangle that uses the second component, which may be implemented in this nonlimiting example as module 105, with a wait command.

To implement this internal fence and wait synchronization process, a memory access unit ("MXU") 110 may be implemented in GPU 84 with a number of register pairs 112, 113. Register pairs 112, 113 of MXU 110 may be assigned for the synchronization of any pair of pipeline blocks connected to MXU 110, such as modules 103-105. Thus, the internal fence and wait commands that may be initiated by the modules 103, 104, 105 may specify an address and include data.

Rather than writing data to the memory via MXU 110 for an internal fence, the MXU 110 may reserve registers 112 and 113 (which may also be described as register pairs) for this purpose. In at least one nonlimiting example, the register pairs (i.e., internal fence/wait pair of registers and compare logic) 112, 113 may be 32 pairs of 64-bit internal registers that are used for updating and comparing, instead of for actually storing data. Essentially, one or more modules 103, 104, 105 may be configured to write to a designated first portion of a particular register pair 112. Plus, another module may be configured to write to the same register pair 112, thereby resulting in a comparison between the value stored in first portion of the particular register pair. Based upon whether the information contained in two separated-in-time write operations are the same or different, the MXU 110 may or may not acknowledge the module that orchestrated the second attempted write command. If the second write command from the second module is not acknowledged, the result may be that the second module is stalled from other operations and continues to loop in a write attempt.

Figure 3:
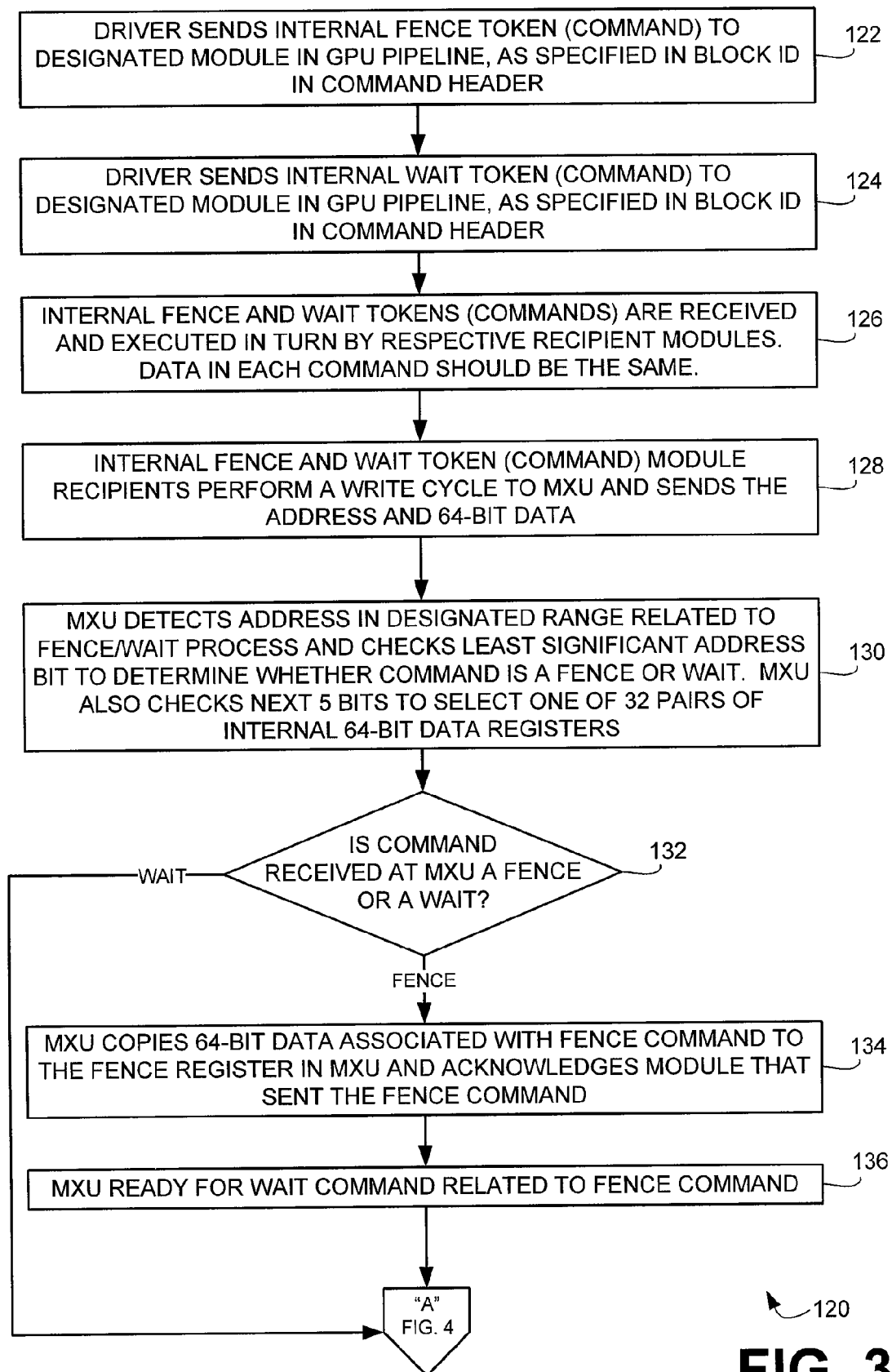
FIGS. 3 and 4 are flowchart diagrams of steps/logic implemented by the GPU of FIG. 1 to executed internal fence/wait synchronization.
Figure 4:
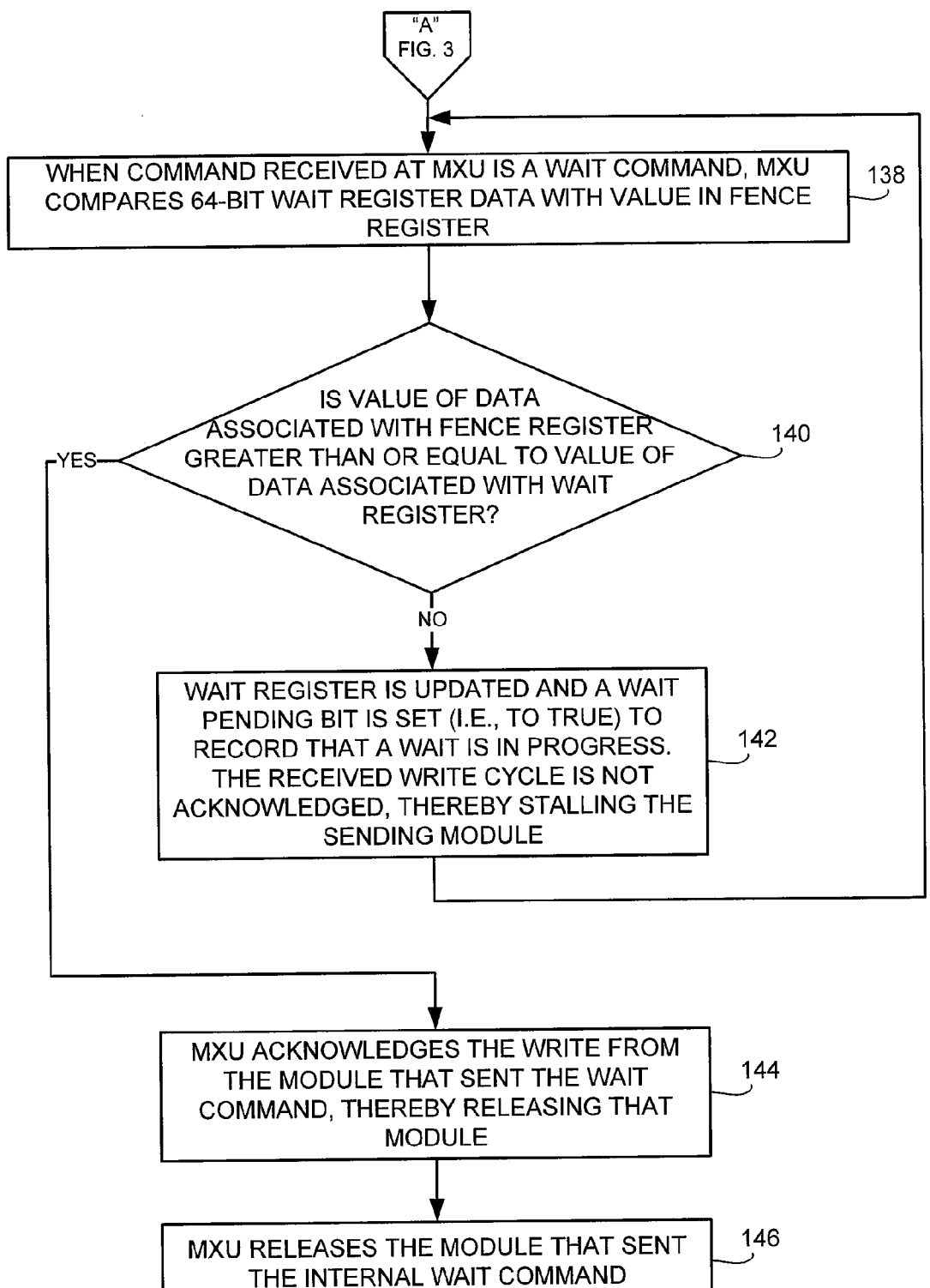

FIGS. 3 and 4 are flow chart diagrams of the process in which GPU 84 may implement in order to internally synchronize the modules 103-105 of GPU 84 with assistance of MXU 110 of FIG. 2. One of ordinary skill in the art would readily appreciate that the steps depicted in FIGS. 3 and 4 may be configured as software or hardware logic. Such logic may comprise programming that makes use of pattern-directed invocation of procedures from predetermined assertions and goals, such as those contained and discussed herein and shown in FIGS. 3 and 4.

In a first step 122, a driver of GPU 84 may send an internal fence token (command) to a designated module, such as one of modules 103-105 of FIG. 2, in the GPU pipeline of GPU 84. This internal fence token may follow a last draw command of a surface processing, which means that another group of following draw commands may access the same surface via MXU 110. The internal fence token may be specified in a block ID portion in the command header of the internal fence token. The format of an internal fence token may be structured as follows:

| Command | DW [0] (32-bit) | DW [1] (32 bit) | DW [2] (32 bit) | DW [3] (32 bit) |
|---|---|---|---|---|
| Internal Sync | Opcode | Memory Address and register select | Data low | Data high |

Although waits are discussed in more detail below, internal sync opcode may be used for both internal fences and waits. Internal fences should be released in the GPU 84 prior to corresponding internal waits, so as to avoid hang results. Nevertheless, in at least one nonlimiting example, the internal sync command may comprise the following format: DW[0] Opcode:

| DW[0] Opcode: | | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| INT | BLOCK ID | | | | | FENCE ID | | | | | | | | | EXT |
| 31 | 30 | 29 | 28 | 27 | 26 | 25 | 24 | 23 | 22 | 21 | 20 | 19 | 18 | 17 | 16 |
| 0 | 1 | 0 | 0 | 0 | 0 | DWF | | Pri | FE | reserved | | | Flip | | |

| | |
|---|---|
| Bit 0 | EXT External fence (For Command Stream Processor 101) 0 = the sync is internal and uses an internal type of the MXU request 1 = the command is an external fence and uses a standard type of the MXU request |
| Bits 9-1 | FENCE ID (For Command Stream Processor 101) These bits are for the driver's use and may have no specific meaning. They are recommended (but not limited) to be used by the driver to identify CSP external fences registered in an event history buffer. |
| Bits 14-10 | BLOCK ID The block ID of the module which should write the data out on receiving the token |
| Bit 15 | INT Interrupt Request —(For Command Stream Processor 101) 0 = do not send an interrupt on processing the fence 1 = send an interrupt to the CPU |
| Bits 17-16 | FLIP Determines if a back end Fence should be stored in a Flip Queue |
| Bit 22 | Front End (For Command Stream Processor 101) 0 = the sync is executed at the specified block or the CSP back end 1 = the sync is executed at the CSP front end, the Block ID is ignored |
| Bit 23 | Privilege (For Command Stream Processor 101) 0 = the sync is not privileged 1 = the sync is privileged |
| Bits 25-24 | DWF = 11 (fence/wait address and 64-bit fence data) |

The 32-bit internal fence or wait token opcode, as set forth above, which corresponds to steps 122 and 124 of FIG. 3, may be followed by the 32-bit address. The address portion of the Internal sync command, or DW[1], may be represented as follows:

| DW 1 ADDRESS[31:0] (internal MXU fence/wait): | | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| Address LSBs | | | | | SEL | | | | WT | reserved | | | | | |
| 31 | 30 | 29 | 28 | 27 | 26 | 25 | 24 | 23 | 22 | 21 | 20 | 19 | 18 | 17 | 16 |
| Address MSBs | | | | | | | | | | | | | | | |

| | |
|---|---|
| Bits 5-0 | The address may be 32-byte aligned so bits 5:0 are "0." In this nonlimiting example, bit 6 may specify a fence, when the bit is set to "0," or wait, when the bit is set to "1". |
| Bit 6 | WT Wait/Fence 0 = the data is for Fence, MXU 110 should just store it in an appropriate fence register 1 = the data is for Wait, the MXU 110 should check the condition and hold the acknowledge until it is satisfied |
| Bits 11-7 | SEL - for selecting one of the 16 pairs of MXU 110 internal fence-wait registers |
| Bits 31-12 | Address of reserved for the MXU fence registers area, should be the same as the value programmed in a |

-continued corresponding "fence register address" register, such as a MXU_INT_SYNC_ADDR register Bits 31:12 should match the address specified in a designated sync block address range register, such as a MXU_INT_SYNC_ADDR register, as but one nonlimiting example. If these bits match the range it may indicate to the MXU 110 a special write cycle. However, if an address in bits 31:12 does not match the specified address (the range defined in the MXU_INT_SYNC_ADDR register), a real or normal, write may be done to memory.

Finally, when a module 103-105 is sending the address described above to MXU 110, data associated with the fence/wait command may be sent in separate digital words, such as DW[2] and DW[3]. DW[2] may contain data corresponding to bits 31:0, which contain the 32-LSBs of 64-bit data. Likewise, DW[3] may contain data in bits 63:32 that are the 32-MSBs of the 64-bit data.

Returning to FIG. 2, the driver generated command stream executed by GPU 84 after several other commands may also contain an internal wait token to a second designated module of modules 103-105 (which are but three of many potential recipient modules in GPU 84). The internal wait token may be constructed as similarly in described above format. Similarly, the designated module 103-105 receives the internal wait token according to the block ID command in the header, as similarly described above and as depicted in step 124 of FIG. 3.

The internal fence and wait tokens sent in steps 122 and 124, as described above, are received and executed in turn by their respective recipient modules 103-105, as shown in step 126. The data value associated with the token pair, in at least one nonlimiting example, are the same.

Thereafter, in step 128, the recipient modules, which may be at least two of modules 103-105 of FIG. 2, perform a write cycle operation to MXU 110. The write operation in step 128 includes the sending of the address and 64-bit data to MXU 110.

Thereafter, in step 130, MXU 110 detects the address of the write cycle and recognizes the address as being in the designated range, as described above, that is, being related to the fence/wait process. More specifically, the address may designate one of a number of predetermined registers in the MXU for this fence/wait process. Thereafter, the MXU 110 may detect the least significant address bit of the write cycle operation received from the modules 103-105. By checking the least significant address bit, which is bit 6 in the nonlimiting example described above, the MXU 110 may determine whether the command is an internal fence command or an internal wait command. The MXU 110 may also check the next 4 bits, in this nonlimiting example, to determine which one of the 16 pairs of internal bit data register pairs 112 is addressed by the write cycle operation.

In step 132, the MXU 110 determines whether the received command is an internal fence command or an internal wait command. If MXU 110 recognizes the received command as an internal fence command, MXU 110 may copy the 64-bit data to a fence register corresponding to an addressed register pair 112 in MXU 110. Stated more specifically, the internal fence command may designate a fence register for writing the data associated with the internal fence command, which is thereafter implemented by MXU 110. This process is shown in step 134 of FIG. 3. Thereafter, in step 136, the MXU 110 registers pair 112 is ready to receive an internal wait command related to the previously received fence command for which data associated with that internal fence command was written into an addressed fence register of one of register pairs 112 (or 113).

As discussed above, in steps 124 and 128, one of modules 103-105 of GPU 84 receives an internal sync command as directed by the driver in step 122. Thus, the recipient module 103-105 that receives the internal sync command for a wait operation (from step 124) performs a write cycle to MXU 110 and sends address and associated 64-bit data, which is previously described in regard to step 128.

Thus, in moving to FIG. 4, process 120 shows in step 138 that when a wait command is received at the MXU 110 from the sending module, the MXU 110 performs a comparison of the 64-bit wait register data associated with the internal wait command with fence register data in the addressed fence register of one of register pair 112, as described above. Stated another way, the received internal wait command at MXU 110 designates in its address one of the register pairs 112, which will be the same as the previously described fence command. The 64-bit data in the wait command is then compared to the 64-bit data associated with the fence command previously written to the corresponding addressed fence register for that same register pair 112.

Step 140 depicts a comparison process of fence register and wait register data. As discussed above, this comparison process may also be configured and/or recognized as comparison logic, which as a nonlimiting example may be in software, hardware, firmware, etc.

Nevertheless, a determination is made in step 140 whether the value of the data associated with the fence register is or is not greater than or equal to the value of the data associated with the subsequently received wait register data for the same designated register pair 112 (or 113). If the result of step 140 is NO, such that the value of the data associated with a fence register for a designated register pair 112 is not greater than or equal to the value of corresponding data for a wait register (or counter) addressed to the same register pair 112, then MXU 110 moves to step 142.

In step 142, which may be configured as register set logic, the wait register for that designated (addressed) register pair 112 (or 113) is updated and a wait pending bit is set, as a nonlimiting example to TRUE, so as to record that a wait is in progress. The received write cycle operation from step 128 is not acknowledged by MXU 110, thereby stalling the sending module, which may be one of modules 103-105, (which represents but a select number of a greater number of processing modules of GPU 84). Thus, after step 142, MXU 110 returns to normal operations awaiting for receipt of a subsequent wait command for that designated register pair 112.

If the result of step 140 is a recognition by MXU 110 that the value of data associated with a wait register for a designated register pair 112 is greater than or equal to the data associated with a corresponding fence register for the designated register pair 112, MXU 110 moves from step 140 to step 144. In step 144, MXU 110 acknowledges the write operation from the module that sent the internal wait command to MXU 110, thereby releasing that module from a stall associated with waiting for an acknowledgement from the MXU 110. More specifically, step 146 follows in that the module that communicated the internal wait command in step 128 is released and is not stalled so that it may continue its processing of data associated with graphics operations.

Thus, as described above, the waiting module (i.e., module 103) that may subsequently perform operations on data previously generated by another module (i.e., module 105) for which the waiting module (103) could not operate on until finished module (105). By not acknowledging the write cycle operation from the waiting module (103), MXU 110 may thereby stall that module (103).

In a command stream, a fence command with the same value generally precedes a wait command. In the pipeline of GPU 84, the fence command in general may be sent to a module which is located in deeper in the pipeline or at the same stage of the pipeline as the wait command is directed. This configuration assists to avoid deadlock in the pipeline when stalled in a wait operation. Otherwise, a pipeline module could block propagation of a fence command with matching or a greater value to designated pipeline unit, which could otherwise result in the fence command not reach MXU 110.

When a wait value for the addressed register pair 112 arrives that is greater than or equal to the value in the fence data register for that same addressed register pair 112, the MXU 110 may acknowledge the module (103) that sent the wait command so as to release that module (103), as shown in regard to steps 144 and 146.

Because the internal fence and internal wait commands may be sent to different pipeline stages, such as modules 105 and 103, respectively, either command might arrive at the MXU 110 first. Thus, MXU 110 may be configured so as to handle either command irrespective of which one is received first without disrupting the sequential operation in either instance.

As a nonlimiting example, if the internal fence command arrives at the MXU 110 first, and, as a nonlimiting example, it specifies a 64-bit value OxFF to fence register zero, MXU 110 may copy the data value OxFF to the addressed 64-bit fence register. The MXU 110 may then check whether there is a wait command pending for that register pair (in the wait register or wait pending counter, etc). In this nonlimiting example, there will not be a wait command pending, since the fence command has arrived first in this instance. Yet, if a wait command is pending, the MXU 110 may perform a comparison operation, as discussed above in regard to step 140, with the wait register value, then release that wait if the fence value is equal to or greater than the value associated with the wait register.

Subsequently, an internal wait sync command received by module 103 may be written to MXU 110. The data value associated with that wait command from module 103 may be OxFF, since it was orchestrated for the corresponding fence sync command sent to module 105, as discussed above. MXU 110 may recognize the internal wait command and then perform the above-described comparison with a corresponding fence register value for the addressed register pair 112. As discussed above, the fence register value OxFF. The compare operation (step 140 of FIG. 4) may result in a "yes" result such that the write request from module 103 is acknowledged by MXU 110. Consequently, module 103 is released to perform other operations and is not stalled.

In an alternate nonlimiting example, it is possible that the internal wait command may arrive first at MXU 110 from module 103. Stated another way, the 64-bit data value associated with the wait command received from module 103 be OxFF. The MXU 110 may receive this internal wait command and data value and perform the comparison with the value in the corresponding fence register, as associated with the addressed register pair 112, as described above.

Thus, in implementing steps 138 and 140 of FIG. 4, the MXU 110 may discover that the data value in the fence register of the addressed register pair 112 may be OxFE due to the fact that the corresponding internal fence command value has not yet arrived from module 105. (The data value OxFE may relate to the data value from a prior fence/wait operation.)

A result of the comparison, as shown and described in regard to step 140, is a NO result. Accordingly, MXU 110 may save the OxFF value associated with the internal wait command received from module 103 in the wait data register of the addressed register pair 112 (or 113). Additionally, the MXU 110 may set a wait pending bit (in a wait pending counter, as a nonlimiting example) to a TRUE logical value, as described above in regard to step 142 of FIG. 4. Furthermore, MXU 110 will not acknowledge the write cycle operation of step 128 from module 103, thereby stalling module 103 from performing additional operations.

Later, however, the internal fence value may arrive from module 105 at MXU 110, which addresses the appropriate register pair 112. Thereafter, MXU 110 may recognize the data value associated with the received internal fence command as being OxFF. Thus, MXU 110 may update the fence register corresponding to the addressed register pair 112. Due to the fact that the wait pending bit has been previously set, as described above and shown in step 142 of FIG. 4, the MXU 110 may thereafter perform a comparison in step 140 of FIG. 4 with the wait register value in the same addressed register pair 112. In this nonlimiting example, the result of the comparison of each of the fence and wait registers for the designated register pair 112 may be equal so that the MXU 110 acknowledges the write operation from module 103. In receiving the acknowledgement from MXU 110, module 103 is released to perform a next operation.

In this nonlimiting example, the comparison operation performed by MXU 110 in step 140 may be configured as a "greater than or equal to" comparison. This comparison may be orchestrated due to the fact that the driver may typically establish the data values associated with each of the internal fence and internal wait commands to be equal. This configuration may be based on a notion that the drivers is configured to establish equal values for internal fence and corresponding internal wait commands, according to each individual sequential event.

However, one of ordinary skill in the art would appreciate that this configuration may accommodate instances wherein a fence data value does not get sent to the MXU 110 for some reason, but wherein a later fence value with an even greater value is somehow sent to the MXU. This situation still releases the waiting module and situations wherein the MXU 110 otherwise recognizes an error between the received fence and wait values. Thus, the configuration described herein is such that undesirable results are avoided so that no module in the graphics pipeline of GPU 84 waits longer than necessary for resuming operations.

As an alternative embodiment, the internal fence and wait synchronization method described above may be implemented in configurations involving more than one GPU. Instead of issuing fences tokens and wait tokens within a single pipeline, such tokens can instead be issued and communicated between multiple GPUs with the same effect.

Figure 5:
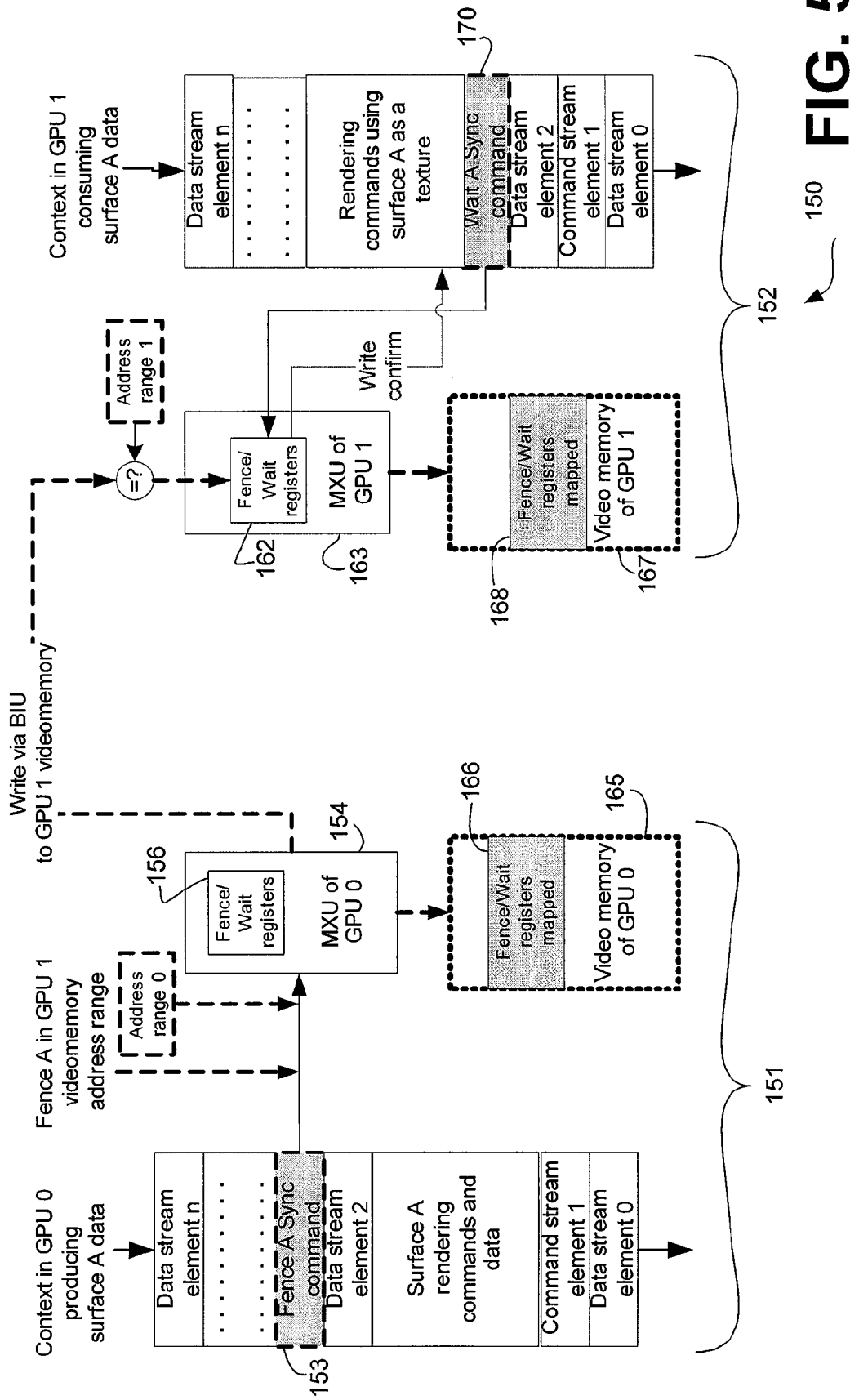
FIG. 5 is a diagram of a method for which multiple GPUs may be configured to implement the internal fence and wait synchronization process of FIGS. 3 and 4.

FIG. 5 is a diagram of a method 150 for which disparate GPUs, 151, 152 could be configured to implement the above-described fence and wait synchronization procedure. As a nonlimiting example, GPU 151 may be configured for rendering odd number bands of pixels, while GPU 152 may be configured to render even number bands of pixels. Both GPUs 151 and 152 may directly read the frame buffer of the other through the MXU through establishment of certain tables in the MXUs.

As a nonlimiting example, in FIG. 5, GPU 152 may use a surface rendered by GPU 151 as a texture for rendering another group of primitives. GPU 152 may not be able to read this surface from the memory until GPU 151 finishes the rendering and sends an appropriate Fence A command 153. A context being executed in a first GPU 151 may cause a Fence A command 153 to be communicated to MXU 154 of GPU 151 according to a particular address that is within a predetermined address range. The fence command and its associated data may be addressed to one of fence/wait register pairs 156.

With respect to video mapping, memories 165, 166, 167, and 168 may be private GPU memory space. That is, memories 165-168 may be reserved address space for fence/wait register pairs or sync register block, which includes 32 pairs. Both GPU 151 and GPU 152 may have this address space 165-168 in the memory. However, actual data may be stored in sync register blocks 156 and 162 respectively.

When GPU 151 executes Fence A command 153, the command may have an address that is not in the range space 166 (Address range 0) but is in the range space 168 (Address range 1). In this nonlimiting example, MXU 154 may not write Fence A command 153 data to block 156, but may instead forward this data, since it is not an internal fence relative to GPU 151.

This Fence A command 153 may reach MXU 163 via a system interface and BIU (not shown) and be written to register block 162. Wait A command 151 is an internal wait command for GPU 152 and is addressed to the same pair of registers selected for GPU 151 and 152 synchronization.

Thus, after receiving the Fence A command 153, MXU 154 communicates with MXU 163 by the bus interface unit of each GPU 151 and 152. The fence command is written to a fence register in GPU 152, as similarly described above.

Subsequently, a wait command 170 in the processing stream of GPU 152 may be communicated to fence/wait registers 162 of MXU 163. Because of the Fence A command 153 having been previously received by MXU 163, MXU 163 thereafter performs a comparison operation between the data associated with that fence command and the wait command 170. If the data associated with the Fence A command 153 (as communicated from GPU 151) is greater than or equal to the data associated with the wait command 170, the fence/wait registers 162 causes MXU 163 to release the module in GPU 152 that communicated the wait command 170 to MXU 163. Thus, in this manner, GPU 151 and GPU 152 are able to implement the above-described fence and wait synchronization procedures in multiple GPUs.

It should be emphasized that the above-described embodiments and nonlimiting examples are merely possible examples of implementations, merely set forth for a clear understanding of the principles disclosed herein. Many variations and modifications may be made to the above-described embodiment(s) and nonlimiting examples without departing substantially from the spirit and principles disclosed herein. All such modifications and variations are intended to be included herein within the scope of this disclosure and protected by the following claims.

The invention claimed is:

1. A synchronization method for a graphics pipeline of a graphics processing unit (GPU), comprising the steps of:
   sending a fence command from a first graphics pipeline module to an addressed register of a designated GPU pipeline module;
   sending a wait command from a second graphics pipeline module to the addressed register of the designated GPU module;
   comparing data in the addressed register of the designated GPU module to data associated with the wait command; and
   responding to the sending of the wait command from the second graphics pipeline module if a value of the data in the addressed register of the designated GPU module is equal to or greater than a value of the data associated with the wait command, wherein the data value associated with the wait command is placed in a wait register of a predetermined register pair of a synchronization register block.

2. The synchronization method of claim 1, further comprising the step of:
   providing no response to the sending of the wait command from the second graphics pipeline module if the value of the data in the addressed register of the designated GPU module is less than the value of the data associated with the wait command.

3. The synchronization method of claim 1, further comprising the step of:
   updating a wait pending counter to a designated indication corresponding to a stall of the second graphics pipeline module in progress.

4. The synchronization method of claim 1, further comprising the step of:
   driving a particular component of the GPU to send a fence token to the first graphics pipeline module; and
   driving the particular component of the GPU to send a wait token to the second pipeline module, wherein at least a portion of data contained in each of the fence and wait tokens is the same.

5. The synchronization method of claim 1, further comprising the steps of:
   detecting an address portion of a received command from one of the first or second graphics pipeline modules;
   determining whether the address portion specifies an address in a predetermined range of addresses; and
   determining whether the received command from one of the first or second graphics pipeline modules is a fence or wait command.

6. The synchronization method of claim 5, further comprising the step of:
   addressing one of a predetermined number of registers in the designated GPU module according to a designated portion of the received command that identifies the one of the predetermined number of the registers.

7. The synchronization method of claim 1, wherein the response to the sending of the wait command from the second graphics pipeline module releases the second graphics pipeline module to process a next command operation.

8. A method for synchronizing components of a GPU according to a register pair, comprising the steps of:
   receiving a fence command from a first GPU module addressed to a predetermined register pair of a synchronization register block;
   placing a data value contained in the fence command in a fence register of the predetermined register pair;
   receiving a wait command from a second GPU module addressed to the predetermined register pair of the synchronization register block;
   comparing the data value contained in the fence register with a data value associated with the wait command;
   stalling the second GPU module if the data value contained in the fence register is less than the data value associated with the wait command; and
   setting a wait pending bit associated with the predetermined register pair of the synchronization register block to a designated logical state associated with a wait in process status for the second GPU module;

wherein the data value associated with the wait command is placed in a wait register of the predetermined register pair.

9. The method of claim 8, further comprising the step of:

acknowledging receipt of the wait command from the second GPU module if the data value contained in the fence register is greater than or equal to the data value associated with the wait command.

10. The method of claim 9, wherein the second GPU module is released to perform a subsequent operation unassociated with the wait command.

11. The method of claim 8, further comprising the step of:

checking a designated portion of each command received to determine whether the received command is a wait command or a fence command.

12. A fence/wait synchronization component of a GPU configured to internally synchronize two or more modules of the GPU, comprising:

a number of register pairs, each of the number of register pairs identified by a designated address and having a fence registry component and a wait registry component;

a fence command that is communicated from a first GPU module to a particular one of the number of register pairs according to the designated address, wherein the fence/wait synchronization component writes a fence data component associated with the fence command to the fence registry component for the designated address;

a wait command having a wait data component that is communicated by a second GPU module to the designated address corresponding to the particular one of the number of register pairs; and comparison logic implemented by the fence/wait synchronization component that compares the fence data component written to the fence registry component with the wait data component so that the second GPU module is acknowledged and released for additional processing operations if the fence data component in the fence registry component is greater than or equal to the wait data component.

13. The fence/wait synchronization component of claim 12, further comprising:

register set logic implemented by the fence/wait synchronization component that sets a wait register to a wait pending logical status if the fence data component in the fence registry component is less than the wait data component.

14. The fence/wait synchronization component of claim 13, wherein the wait data component is written to a wait registry component associated with the particular one of the number of register pairs.

15. The fence/wait synchronization component of claim 14, wherein the fence/wait synchronization component is a memory access unit.

16. The fence/wait synchronization component of claim 12, wherein the first GPU module is acknowledged for communicating the fence command upon receipt of the fence command by the fence/wait synchronization component.

* * * * *